United States Patent

Vitek et al.

[15] 3,673,494

[45] June 27, 1972

[54] ELECTRON BEAM MAGNETOMETER SENSOR

[72] Inventors: Edmund J. Vitek, Glen Burnie; Robert A. Yeates, Linthicum, both of Md.

[73] Assignee: Westinghouse Electric Corporation, Pittsburgh, Pa.

[22] Filed: Sept. 30, 1969

[21] Appl. No.: 862,376

[52] U.S. Cl. ...................................324/41, 313/73, 324/44
[51] Int. Cl. ...................................G01r 33/00, G01r 33/02
[58] Field of Search ...................324/41, 43, 44, 8; 313/73, 313/75

[56] References Cited

UNITED STATES PATENTS

| | | | |
|---|---|---|---|
| 2,666,268 | 1/1954 | Kleiler | 324/44 UX |
| 3,470,466 | 9/1969 | Shelton | 324/109 X |

OTHER PUBLICATIONS

Barber et al., IBM Tech. Discl. Bul., Dec. 1958, pgs. 6–7.
Electronics; April 3, 1967, pgs. 270–271.

*Primary Examiner*—Alfred E. Smith
*Attorney*—F. H. Henson and E. P. Klipfel

[57] ABSTRACT

Described is a device for detecting disturbances in magnetic fields, particularly the magnetic field of the earth, by means of a vacuum tube containing an electron gun which emits an electron beam and directs it between spaced pole pieces located within the envelope of the vacuum tube itself. The earth's magnetic field surrounding the tube is concentrated at the gap between the pole pieces such that the presence of a magnetically permeable body near the tube will alter the magnetic field intensity across the gap and cause the electron beam to deflect. This deflection is sensed by electrical circuitry to indicate the existence of a disturbance and its magnitude. The invention finds utility, for example, in geophysical exploration and in detecting concealed items of magnetically permeable material, such as concealed guns.

11 Claims, 5 Drawing Figures

PATENTED JUN 27 1972   3,673,494
INVENTORS.
EDMUND J. VITEK &
ROBERT A. YEATES
By Ernest P. Kipfel
Attorney
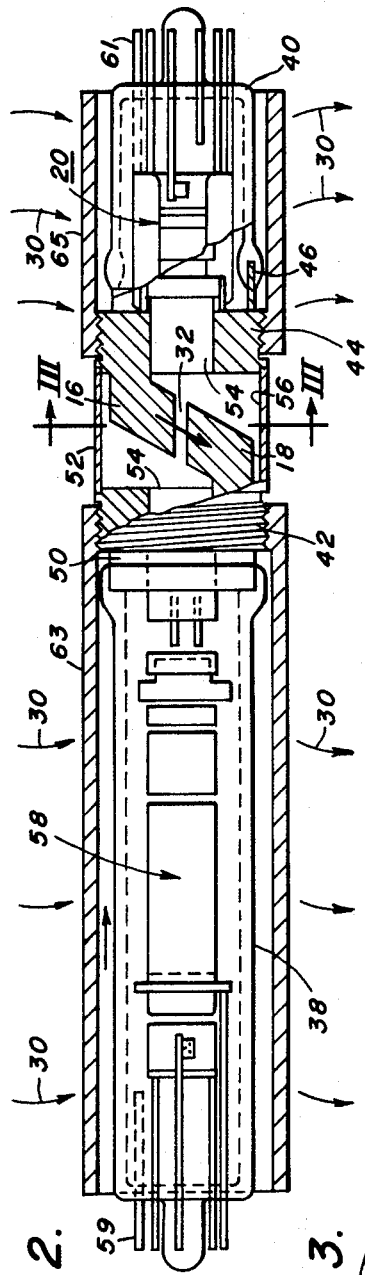
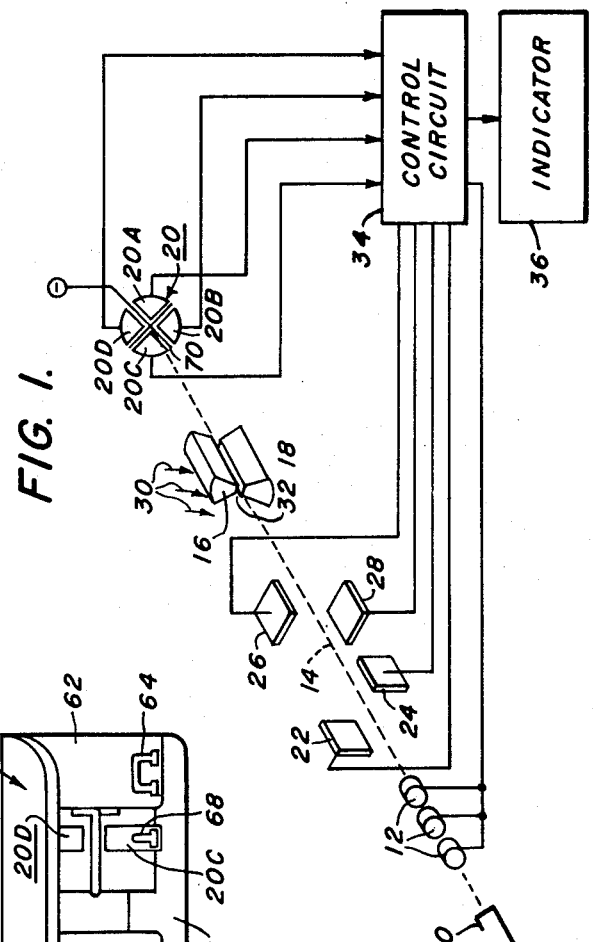
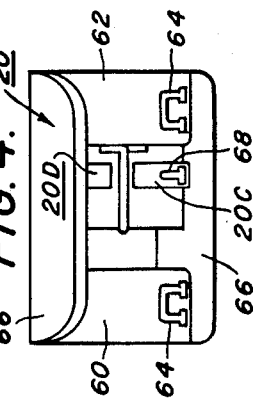
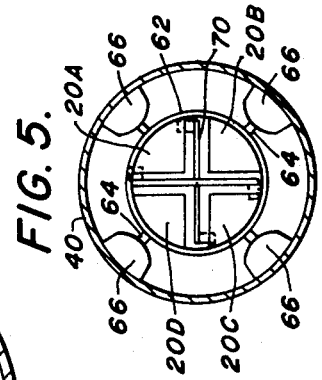
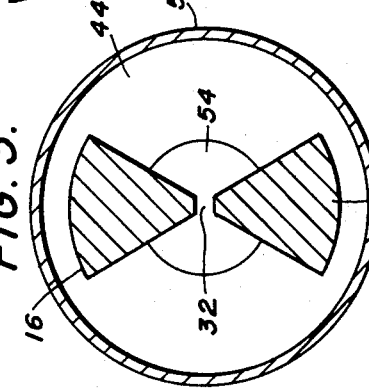

ELECTRON BEAM MAGNETOMETER SENSOR

CROSS-REFERENCES TO RELATED APPLICATIONS

Copending application Ser. No. 862,375, filed Sept. 30, 1969 and application Ser. No. 862,278, filed Sept. 30, 1969.

BACKGROUND OF THE INVENTION

In the past, magnetometers have been devised for detecting disturbances in the earth's magnetic field on the principle that an electron beam, which is centered under the influence of a normal magnetic field, will be deflected whenever that field is disturbed. This deflection, in turn, can be sensed to actuate an alarm or can be used to drive a meter or recorder which indicates the magnitude of the deflection.

Most prior art magnetometers of this type are not as effective as they might otherwise be, mainly because they are not capable of concentrating the earth's magnetic field across a small gap traversed by the electron beam. In this respect, the pole pieces of such devices are ordinarily outside the evacuated glass envelope housing the electron gun and associated components. Consequently, the earth's magnetic field must pass through a high reluctance gap where it is not as effective in deflecting the electron beam as it might otherwise be.

SUMMARY OF THE INVENTION

As an overall object, the present invention seeks to provide a magnetometer which overcomes the disadvantages of prior art devices of this type in that the earth's magnetic field is concentrated across a small gap between a pair of pole pieces, the space between the pole pieces being traversed by an electron beam.

More specifically, an object of the invention is to provide a device of the type described in which the pole pieces are contained within an evacuated envelope of an electron tube rather than outside the evacuated envelope.

Still another object of the invention is to provide a new and improved electron target or collector in a magnetometer which affords extremely high sensitivity regardless of the direction in which the electron beam of the magnetometer is deflected.

In accordance with the invention, apparatus for detecting disturbances in a magnetic field is provided comprising an evacuated envelope containing a electron gun adapted to emit a beam of electrons. This beam of electrons is directed against an electron target or collector. In the path of the electron beam between the gun and the target are pole pieces separated by a gap through which the electron beam passes. An external magnetic field, such as the earth's magnetic field, is concentrated across the gap between the pole pieces which are contained within the evacuated envelope itself. Preferably, the evacuated envelope on either side of the pole pieces is surrounded by a shield of magnetically permeable material which directs the magnetic field across the gap formed between the pole pieces.

When a magnetically permeable object intersects the magnetic field to which the detecting apparatus is subjected, the field existing across the aforesaid gap between the pole pieces is altered. This alteration, in turn, causes a deflection in the electron beam which can be used to actuate a meter, a recorder, or an alarm. Means are further provided for automatically centering the beam after it is deflected such that any further disturbances in the magnetic field will be immediately detected. The invention can be used, for example, in cases where it is desired to detect concealed weapons. In this case, the earth's magnetic field is that field to which the detecting apparatus is subjected. When an individual carrying a concealed weapon, for example, intersects the magnetic field adjacent the detecting device, the electron beam is immediately deflected to indicate the existence of the concealed weapon. The sensitivity of the device can be adjusted such that an alarm will not be actuated in response to magnetically permeable objects of less mass than a gun as, for example, a belt buckle, watch or other similar device normally carried by an individual.

The above and other objects and features of the invention will become apparent from the following detailed description taken in connection with the accompanying drawings which form a part of this specification, and in which:

FIG. 1 is a schematic illustration of the magnetometer apparatus of the present invention;

FIG. 2 is a cross-sectional view of the magnetometer of the invention;

FIG. 3 is a cross-sectional view taken along line III—III of FIG. 2;

FIG. 4 is a broken-away elevational view of the electron target utilized in the magnetometer of FIG. 2; and FIG. 5 is an end view of the apparatus shown in FIG. 4.

With reference now to the drawings, and particularly to FIG. 1, the magnetometer of the invention includes an electron-emitting cathode 10 and one or more focusing grids 12 which direct an electron beam 14 between pole pieces 16 and 18 and onto a split target or collector 20 which acts like the anode of a conventional electron gun. The electron beam 14, after being focused by the grids 12, passes between horizontal deflection plates 22 and 24 and vertical deflection plates 26 and 28. The earth's magnetic field, indicated by the arrows 30 in FIG. 1, passes through the upper pole piece 16, thence across gap 32 which separates the pole pieces, and then to the pole piece 18. In so doing, the magnetic field, which is concentrated at the gap 32, intersects the electron beam 14.

The target 20 is divided into four sectors 20A, 20B, 20C and 20D as shown. These sectors are connected to a control circuit 34 which is the subject matter of copending application Ser. No. 862,375, filed concurrently herewith and assigned to the Assignee of the present application. The control circuit, in turn, is connected to the horizontal deflection plates 22 and 24 as well as the vertical deflection plates 26 and 28.

Let us assume, for example, that the electron beam 14 is deflected by the magnetic field existing across gap 32 such that it is directed onto the sector 20A. Under these circumstances, the electron beam has been deflected to the right as viewed in FIG. 1. The control circuit 34 senses the increased negative charge on the sector 20A and, in turn, increases the negative charge on the right horizontal deflection plate 24, thereby moving the electron beam 14 back toward the center of the device, or to the left. Similarly, if the electron beam 14 should move upwardly onto sector 20D, the control circuit 34 will increase the negative charge on the upper vertical deflection plate 26, thereby causing the electron beam 14 to move downwardly, toward the center. The same is true of sectors 20B and 20C, except that in this case, the negative charge on plates 22 and 28, respectively, is increased when the beam moves to the left or downwardly. In this manner, whenever the electron beam is deflected, it is automatically recentered by the control circuit 34 and the vertical and horizontal deflection plates. The recentering voltage on the deflection plates is monitored by the control circuit 34 which actuates an indicator or an alarm 36 which indicates the existence of a magnetically permeable object in the field 30 which caused the deflection of the electron beam 14.

The details of an actual magnetometer are shown in FIG. 2. It comprises two glass envelopes 38 and 40 interconnected by means of an assembly including a pair of generally annular, threaded members 42 and 44. The member 44, for example, has an annular flange 46 welded or otherwise securely fastened to its rear surface. This annular flange 46, in turn, forms a glass-to-metal seal with the glass envelope 40. Likewise, the annular member 42 is provided with an annular flange 50 projecting rearwardly which is hermetically sealed to the right end of the glass envelope 38.

The two annualr members 42 and 44 are interconnected by means of a cylindrical spacer 52 which is hermetically sealed to the two members 42 and 44. The members 42 and 44 are provided with central openings 54 which connect the annular chamber 56 formed by spacer 52 with the interiors of the glass envelopes 38 and 40. In this manner, the envelope 38, the chamber 56 formed by the annular spacer 52 and the glass envelope 40 form a contiguous enclosure which is evacuated.

Integrally formed with the member 42 is the lower pole piece 18 schematically illustrated in FIG. 1. The pole piece 18, as best shown in FIG. 3, forms an approximate sector of a circle. Similarly, the upper pole piece 16 is integrally formed with the member 44 and, in cross section, is also in the form of an approximate sector of a circle as viewed in FIG. 3. The space between the two pole pieces 16 and 18 forms the gap 32 referred to with respect to FIG. 1 and through which the electron beam 14 passes.

The cathode 10, focusing grids 12 and deflection plates 22–28 of FIG. 1, generally indicated by the reference numeral 58 in FIG. 2, are all contained within the glass envelope 38 connected to the member 42. Connections to these elements are by prongs 59 projecting through the envelope 38. The split target 20, on the other hand, is contained within the glass envelope 40 and is provided with projecting prongs 61 for connection to external circuitry. Electrons emitted by the assembly 58 will pass through opening 54 of member 42, the gap 32, and opening 54 in member 44 to the split target 20.

Threaded onto the annular members 42 and 44 are two shields 63 and 65 of magnetically permeable material such as iron. These shields act, in effect, as collectors of an external magnetic field, indicated by the arrows 30, and direct the field across the gap 32. Thus, the entire magnetic field surrounding the device is concentrated at the gap 32 through which the electron beam passes. All other parts of the device such as the deflection plates and target 20 are essentially unaffected by the field. A change in the surrounding field due to the entrance of a magnetically permanent object will, in effect, be magnified at the gap to cause the electron beam to deflect with great sensitivity. The cylindrical spacer 52 is formed from other than magnetically permeable material to provide an area of magnetic isolation, except through the pole pieces.

The details of the target 20 are shown in FIGS. 4 and 5. It comprises a pair of cylindrical members 60 and 62 provided with clips 64 embedded in insulating glass spacers 66 which engage the inner periphery of the glass envelope 40. Intermediate the two cylindrical members 60 and 62 is the split target 20 itself comprising the four segments 20A–20D. These four segments are provided with clips 68 also embedded in the glass spacers 66. Secured to the rear edge of the annular member 62 is a knife-edge 70, in the form of a cross, which extends through the slots formed between the four quadrants of the collector 20A–20D. This knife-edge, in turn, is connected to a source of negative potential as shown in FIG. 1. In actual practice, the knife-edge and sectors shown in FIG. 5 will be tilted at an angle of 45° with respect to the horizontal and vertical deflection plates as shown in FIG. 1, or vice versa.

The purpose of the knife-edge is to deflect the beam evenly on either side of the center of the target or collector assembly 20. If it were not for the knife-edge, the beam would tend to pass through the openings formed between the quadrants 20A–20D and the sensitivity of the device would suffer. However, with the knife-edge negatively charged, the beam tends to split evenly in all directions. In the absence of deflection of the beam 14 due to a magnetic disturbance, the system is balanced with the beam remaining on-center.

The invention thus provides a new and improved means for detecting disturbances in a magnetic field, wherein the field is concentrated at a gap through which an electron beam passes; the remainder of the elements are essentially shielded from the magnetic field; and the electron target, because of its split construction combined with a center knife-edge, provides for extremely good sensitivity.

Although the invention has been known in connection with a certain specific embodiment, it will be readily apparent to those skilled in the art that various changes in form and arrangement of parts may be made to suit requirements without departing from the spirit and scope of the invention.

We claim as our invention:

1. In apparatus for detecting disturbances in a magnetic field caused by imposition of a magnetically permeable member in said field, the combination of an evacuated envelope containing an electron gun adapted to emit a beam of electrons, a target against which said electron beam is directed, said target being divided into at least four electrically conductive parts mutually insulated from each other, a pair of pole pieces contained within said evacuated envelope and separated by a gap through which said electron beam passes, said pole pieces having cross-sectional configurations in a plane extending generally perpendicular to said electron beam comprising oppositely disposed sectors of a circle with said gap extending between the radial innermost ends of the sectors, means for causing said magnetic field to pass across said gap, and means operatively associated with said electron gun for causing said electron beam to again be centered after it is deflected by a disturbance in said magnetic field.

2. The apparatus of claim 1 wherein said pole pieces are carried on spaced annular members of magnetically permeable material, and a cylindrical spacer interconnecting said annular members and forming a chamber containing said pole pieces.

3. The apparatus of claim 2 including a first glass envelope secured to the side of one of said annular members opposite the pole pieces, a second glass envelope secured to the side of the other of said annular members opposite said pole pieces, said electron gun being positioned within one of said glass envelopes, said target being positioned within the other of said glass envelopes, the envelopes communicating with the chamber containing the pole pieces and said chamber, and said chamber and envelopes being evacuated.

4. The apparatus of claim 3 wherein the electron gun in one of said envelopes directs a beam of electrons through the gap formed between the pole pieces in said chamber and thence onto said target.

5. The apparatus of claim 3 including tubular members of magnetically permeable material secured to the outer peripheries of said annular members and extending over said glass envelopes to cover the same.

6. The apparatus of claim 1 wherein the gap between the two pole pieces is between their points of narrowest width.

7. The apparatus of claim 1 wherein said target is formed from a plurality of sectors of a circle separated by a space therebetween, whereby deflection of said electron beam due to a disturbance in said magnetic field will cause an unbalance in the negative charge on said sectors.

8. The apparatus of claim 7 including a knife-edge in the space between said sectors and means for connecting a source of negative potential to said knife-edge whereby it will repel said electron beam, prevent it from passing through said space and evenly scatter it over said sectors in the absence of deflection in said electron beam.

9. The apparatus of claim 8 wherein there are four sectors and said knife-edge is in the form of a cross in the space between said sectors.

10. The apparatus of claim 7 wherein said electron gun is provided with beam deflection devices operatively connected to said sectors whereby an unbalanced charge pattern on said sectors due to deflection of said beam will cause said deflection devices to again center the beam.

11. The apparatus of claim 10 wherein said deflection devices comprise vertical and horizontal electrostatic deflection plates.

* * * * *